Dec. 8, 1953  J. J. SLOMER  2,661,755
UNLOADING VALVE FOR FLUID PRESSURE SYSTEMS
Original Filed May 1, 1946  2 Sheets-Sheet 1
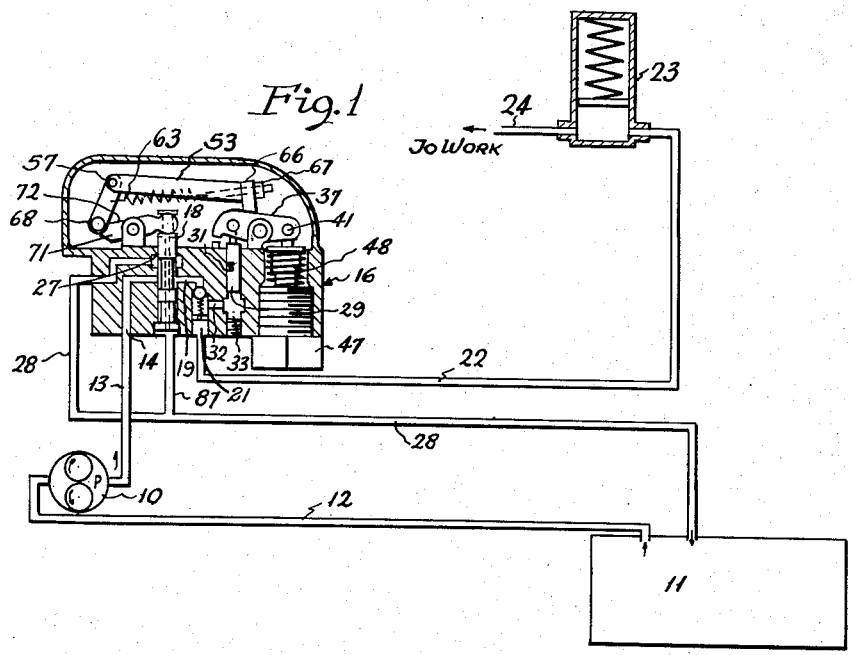
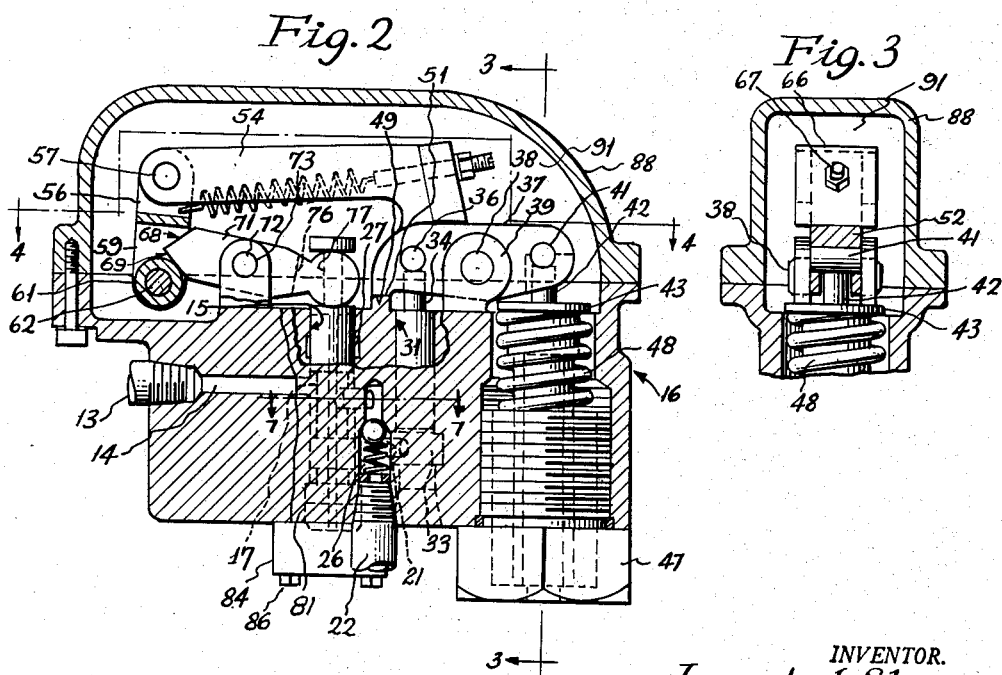
INVENTOR.
Joseph J. Slomer
BY
Clarence F. Poole
ATTORNEY Dec. 8, 1953                J. J. SLOMER                 2,661,755
              UNLOADING VALVE FOR FLUID PRESSURE SYSTEMS
Original Filed May 1, 1946                         2 Sheets-Sheet 2
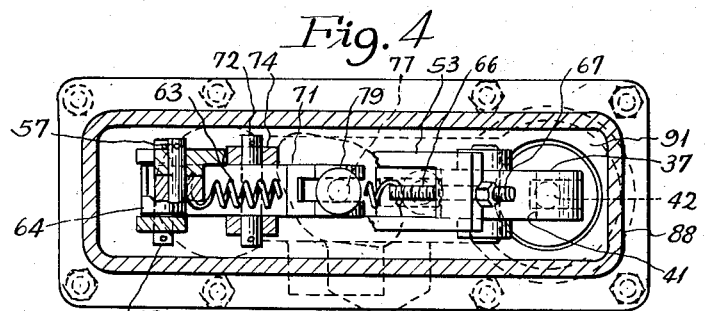
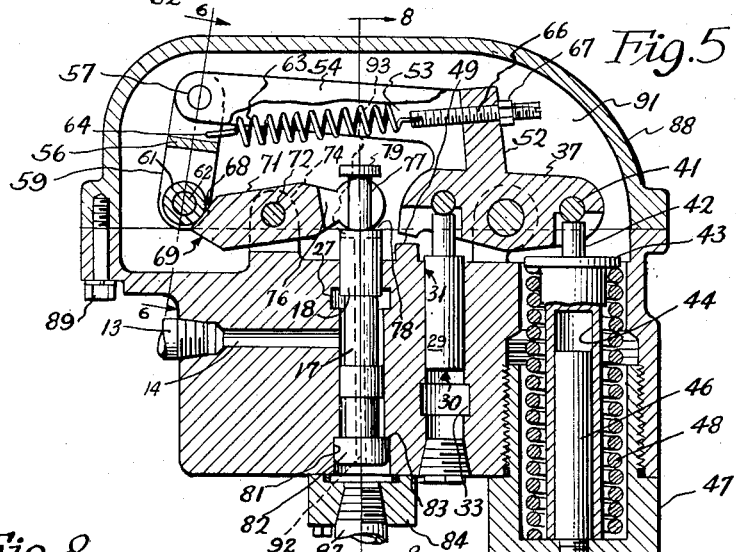
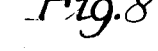
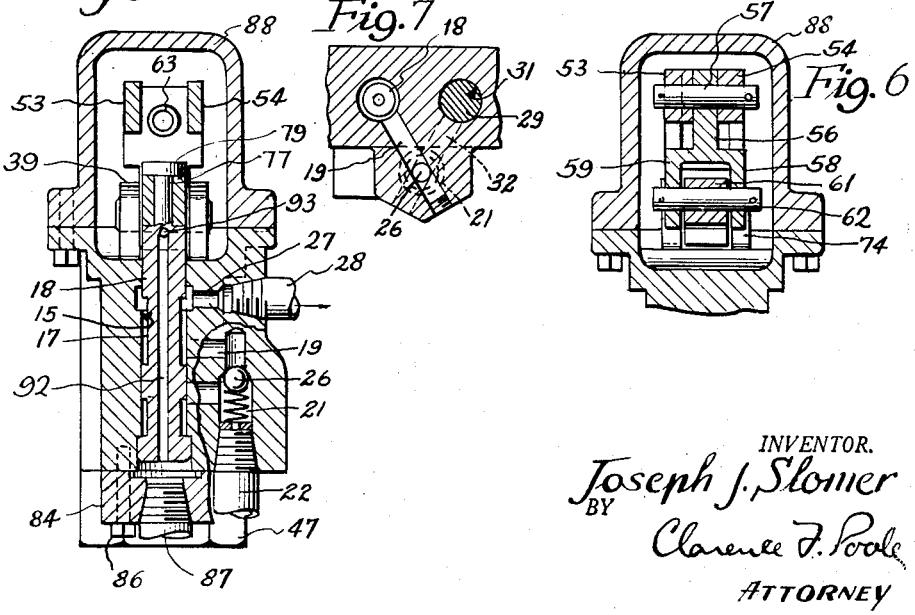
INVENTOR.
Joseph J. Slomer
BY Clarence F. Poole
ATTORNEY Patented Dec. 8, 1953

2,661,755

UNITED STATES PATENT OFFICE 2,661,755

UNLOADING VALVE FOR FLUID PRESSURE SYSTEMS

Joseph J. Slomer, Chicago, Ill., assignor to Goodman Manufacturing Company, Chicago, Ill., a corporation of Illinois Original application May 1, 1946, Serial No. 666,467, now Patent No. 2,467,238, dated April 12, 1949. Divided and this application December 21, 1948, Serial No. 66,560

8 Claims. (Cl. 137—108)

This application is a division of my application Serial No. 666,467 for "Improvements in Fluid Pressure Cable Reel Drive," filed May 1, 1946, now Patent 2,467,238, dated April 12, 1949.

This invention relates to fluid pressure systems and has particular reference to an improved unloading valve for fluid pressure systems.

In fluid pressure systems the practice has been to provide a continuously operating pump which supplies fluid to an accumulator for storing the fluid under pressure, such systems being operable so that when a predetermined pressure has been attained in the accumulator, the pressure fluid supplied by the pump is unloaded back to the reservoir. Heretofore such pumps have been required to operate continuously against a back pressure into the reservoir, such back pressure being necessary in order to cause the unloading valve to operate. This back pressure against the fluid pump in discharging to the reservoir after the accumulator has been loaded to a predetermined value causes unnecessary wear on the pump parts and also on the motor driving the pump.

With the foregoing considerations in mind, it is the principal object of this invention to enable the fluid supplied by a pump to be discharged to the reservoir when the pressure in an accumulator has reached a desired value, the fluid pumped to the reservoir being discharged with substantially no back pressure against the pump.

Another object is to afford a regulator or unloading valve for a fluid pressure system which will operate substantially instantaneously upon attaining a desired pressure in the accumulator of such a system, the unloading position of the valve being such that there will be substantially no back pressure against the fluid pump.

Yet another object is to afford a fluid pressure unloading valve which will be constantly subjected to lubrication from the fluid in the system, thereby preventing binding of the valve elements, and insuring against deterioration thereof.

The above and other objects of the invention will be apparent from the description following, taken together with the drawings which show a preferred embodiment of the invention, and what is now considered to be the best mode of applying the principles thereof. While the invention is described in terms of a preferred embodiment thereof, its scope is not intended to be limited in terms of the embodiment shown, nor otherwise than by the claims appended to this specification.

In the drawings:

Figure 1 is a schematic showing of a fluid pressure system showing the regulator or unloading valve according to the present invention embodied therein;

Figure 2 is an enlarged vertical section taken through the regulator or unloading valve of Figure 1;

Figure 3 is a fragmentary section taken substantially along the line 3—3 of Figure 2, certain parts being shown in elevation;

Figure 4 is a horiozntal section taken substantially along the line 4—4 of Figure 2;

Figure 5 is a longitudinal sectional view somewhat similar to Figure 2 but showing the valve in a different position;

Figure 6 is a section taken along the line 6—6 of Figure 5;

Figure 7 is a horizontal section taken along the line 7—7 of Figure 2; and

Figure 8 is a sectional view taken along the line 8—8 of Figure 5.

Referring now to Figure 1 of the drawings, there is shown a pump 10 which takes fluid from a reservoir 11 through a fluid conduit 12 to pump the fluid under pressure through a pressure conduit 13 and into an inlet pressure passageway 14 formed in the body or housing of a regulator or unloading valve 16. The pumped fluid flows past a restricted diameter portion 17 (Fig. 5) of a valve member 18 slidable in a bore 15 (Fig. 2) and normally biased in the direction as shown in Figure 2, and through a port 19 (see also Figures 7 and 8) which is connected to an outlet pressure passageway 21. The pressure passageway 21 is connected by a fluid conduit 22 to an accumulator 23, which is connected to a pressure conduit 24 to operate any type of fluid motor as is common in the art. The passageway 21 is provided with a ball check valve 26 against the return of fluid from the accumulator 23.

Means are provided for controlling the movement of the valve member 18 in accordance with the pressure in the line 22 and accumulator 23, the valve member 18 being movable, by means as will be described, responsive to an increase of pressure in the pressure passageway 21 and the accumulator 23 beyond a certain amount to an unloading position as seen in Figures 1 and 5, to by-pass the fluid from the pump 10 back to the reservoir 11. As shown in Figures 1 and 5, the valve member 18 is movable to the unloading position to connect the pressure passageway 14 to a relief port or bypass passageway 27 which is connected to a return pipe 28 to the reservoir 11.

In order for the valve member 18 to be moved to the position to unload pressure fluid, there is provided a plunger 29 which is slidable in a bore 31 formed in the valve body 16, and which has a face 30 exposed to pressure in the accumulator 23, a passageway 32 (Fig. 7) being provided which connects the pressure passageway 21 with a pressure or surge chamber 33 formed in the valve body 16.

The plunger 29 is reduced at its outer end as at 34 (Fig. 2) and abuts a roller 36 held in a rocker arm 37 which is pivoted at 38 to a support 39 formed on the top of the valve body 16. The rocker arm 37 is biased in a counterclockwise direction to oppose the pressure in the chamber 33 against the piston member 29. To this end the other end of the rocker arm 37 is provided with a roller 41 which is abutted by a plunger 42 having a shoulder 43, and which is counter-bored at 44 to cooperate with a liner pin 46 tapped into a closure member 47 threaded into the valve body 16. A loaded spring 48 abuts the inside face of the closure member 47 and abuts the shoulder 43 at its other end, the spring 48 thus tending to raise the plunger 42 to rock the rocker 37 in a counterclockwise direction.

A stop 49 is provided on the valve body 16 to limit the amount of counterclockwise movement of the rocker arm 37, the stop 49 cooperating with a surface 51 formed on the left end of the rocker arm 37. It will be seen that the pressure in the chamber 33 normally tends to rock the arm 37 in a clockwise direction about the pivot 38 against the force in the spring 48, and it will be apparent that when the pressure in the accumulator 23 is below a predetermined value that the load in the spring 48 will rock the arm 37 in a counterclockwise direction against the stop 49.

The rocker arm 37 is formed integrally with an arm 52 which has a pair of fingers 53 and 54 extending therefrom, see also Figures 6 and 8, which provide a clevis connection for a toggle 56, which has a pin connection as at 57 to the ends of the fingers 53 and 54. The toggle 56 has a substantially inverted Y configuration as seen in Figure 6, and includes a pair of depending arms 58 and 59 which straddle a roller 61 journaled on a pin 62 spanning the depending arms 58 and 59.

The toggle 56 is biased by a spring 63 so that it tends to move in a counterclockwise direction with respect to the fingers 53 and 54, the spring 63 being connected to the toggle 56 at 64 and connected at its other end to the arm 52 by means of an adjusting screw 66 and adjusting nut 67 whereby the tension in the spring 63 may be readily adjusted. The roller 61 is urged by the spring 63 to engagement with a surface 68 or a surface 69 on the end of a lever 71, which is pivotally connected at 72 to a pair of upstanding supports 73, 74 formed on the valve body 16. The other end of the lever 71 is slotted at 76 and rounded to straddle a reduced portion 77 of the valve member 18 and to lie between a shoulder 78 and a head 79 formed on the valve member 18.

In order that the valve member 18, in moving to the unloading position as seen in Figures 1 and 5, may be limited only to the movement necessary to cause the restricted portion 17 to be in register with the ports 27 and 14, the valve body 16 is counterbored as at 81 with a larger diameter than the bore 15, and the valve member 18 has an enlarged portion 82 adapted to move within the counterbore 81 and to be limited in its upward movement to the unloading position by means of a shoulder 83 formed between the bore 15 and the larger bore 81. The downward movement of the valve member 18 in moving to the position where the pump 10 is supplying fluid under pressure to the reservoir 23, is limited by an end closure member 84 which closes the outer end of the counterbore 81, and which is secured to the valve body by a plurality of cap bolts 86, see also Figure 8. The closure member 84 is adapted to receive a fitting for a drain conduit 87 which branches from the return conduit 28 to the reservoir 11.

The valve actuating assembly which includes the rocker arm 37, the toggle 56, and the lever 71, is enclosed in a housing 88 which is secured to the valve body by a plurality of cap bolts 89, thereby providing a chamber 91 within which the valve operating mechanism is adapted to operate and be sealed against the entrance of foreign material. The valve operating mechanism contained within the chamber 91 is adapted to be lubricated by the pressure fluid which escapes around the valve member 18 and the plunger 29. Likewise, the plunger 42, the liner pin 46, and the spring 48, which are held within the closure 47, are adapted to be lubricated by pressure fluid escaping past the valve member 18 and the piston member 29. Any excess of fluid escaping past these members is permitted to be drained from the chamber 91 by means of an axial bore 92 in the valve member 18, which is connected to a cross bore 93 at the operating end of the valve member 18 within the housing 91.

The operation of the valve thus far described is as follows:

Assuming the valve is in the position shown in Figure 2, fluid is supplied under pressure by the pump 10 to flow past the restricted portion 17 of the valve member 18 and out of the valve body 16 past the check valve 26 and through the conduit 22 into the accumulator 23. The pressure in the accumulator 23 is also communicated, through passageway 32, against the face 30 of the plunger 29, tending to urge the plunger 29 in a direction to move the rocker arm 37 in a clockwise direction against the force of the spring 48. When the pressure in the accumulator 23 is sufficient to cause the rocker 37 to be moved in a clockwise direction against the force in the spring 48, the arm 52 together with the fingers 53 and 54 will also rock in a clockwise direction, tending to lift the toggle 56 upwardly. However, the free movement of the toggle 56 with respect to the lever 71 is impeded by the surfaces 68 and 69 over which the roller 61 of the toggle 56 must move. When the pressure in the accumulator 56 is sufficient to rock the arm 52 and the fingers 53 and 54 in a clockwise direction a sufficient amount to cause the roller 61 to move over the surface 69 and onto the surface 68 of the lever 61, the spring 63 connecting the toggle 56 with the arm 52 will give a snap action to the valve member 18 causing it to be lifted by the rocking of the lever 71 in a counterclockwise direction. In this position of the valve, as seen in Figures 1 and 5, the pressure fluid from the pump 10 will be by-passed past the restricted portion 17 of the valve member 18 and discharged into the reservoir 11 by means of the conduit 28.

When the pressure in the accumulator 23 falls to a certain value because of the fluid supplied thereby to various fluid motors or the like, the plunger 29 will no longer be able to oppose the force in the spring 38, and the spring 48 will thereupon rock the rocker arm 37 and the fingers 53 and 54 in a counterclockwise direction. The spring 63 connecting the toggle 56 and the arm 52 normally tends to oppose the movement of the roller 61 over the surface 68 and onto the surface 69, but when sufficient rocking movement of the rocker arm 37 has taken place the roller 61 will move from the surface 68 onto the surface 69 and the tension in spring 63 will cause the lever 71 to be moved with a snap action to move the unloading valve to the position as seen in Figure 2. In this position, as has been explained, the pump once more passes fluid through the valve 16 and into the accumulator 23, the sequence of operations again taking place upon attaining a predetermined pressure in the accumulator 23.

Thus has been described a novel and simple form of construction for an unloading valve for a fluid pressure system. The valve according to the present invention is characterized by extreme simplicity of the moving parts thereof, all moving parts being additionally lubricated by the pressure fluid. The unloading valve according to the present invention is additionally characterized by complete freedom from the entrance of foreign material which would impair the useful life and operation of the valve.

While the invention has been described in terms of a preferred embodiment it is not intended that the invention be limited in terms by the embodiment shown, nor otherwise except by the terms of the claims here appended.

I claim as my invention:

1. In a pressure regulating valve, a valve block, a valve chamber within said block, a pressure passageway leading into said valve block to said valve chamber, a passageway leading from said chamber out of said block, a valve piston movable within said block into position to block the passage of fluid from said chamber to said second passageway, a pressure passageway leading from said chamber out of said block, a check valve in said passageway, to prevent the passage of fluid from said passageway back to said chamber, a surge chamber connected with said last mentioned passageway, on the side of said check valve opposite from said chamber, a piston movable within said surge chamber, and an operative connection from said piston to said valve piston to move said valve piston to a position to release fluid through said passageway leading from said valve chamber upon predetermined pressures in said pressure passageway leading from said valve block, said operative connection including a rocking member, an operative connection from said piston to said rocking member, for moving said rocking member in one direction, yieldable means having engagement with the opposite end of said rocking member for moving said rocking member in another direction and for retracting said piston within said surge chamber, a lever arm pivoted intermediate its ends and having operative connection with said valve piston for moving said valve piston along said valve chamber, the end of said lever arm opposite from said valve piston having a V-shaped engaging surface, and a roller connected with said rocking member and yieldably urged into engagement with said V-shaped engaging surface of said lever arm, for instantaneously pivoting said lever arm in one direction upon pivotal movement of said rocking member in an opposite direction, to cause said rocking arm to quickly move said valve piston into position to release fluid from said passageway leading from said chamber, when pressures in said surge chamber reach a predetermined value.

2. In a pressure regulating valve, a valve block, a valve chamber within said block, a pressure passageway leading into said valve block to said valve chamber, a passageway leading from said chamber out of said block, a valve piston movable within said block into position to block the passage of fluid from said chamber to said second passageway, a pressure passageway leading from said chamber out of said block, a check valve in said passageway to prevent the passage of fluid from said passageway back to said valve chamber, a surge chamber connected with said last mentioned passageway, on the side of said check valve opposite from said valve chamber, a piston movable within said surge chamber, and an operative connection from said piston to said valve piston to move said valve piston to a position to release fluid through said passageway leading from said valve chamber upon predetermined pressures in said pressure passageway leading from said valve block, said operative connection including a rocking member, an operative connection from said piston to said rocking member, for moving said rocking member in one direction, yieldable means having engagement with the opposite end of said rocking member for moving said rocking member in another direction and for retracting said piston within said surge chamber, a lever arm pivoted intermediate its ends and having operative connection with said valve piston for moving said valve piston along said valve chamber, the end of said lever arm opposite from said piston having a V-shaped engaging surface, an arm extending from said rocking member along said lever arm, a link pivoted to the end of said arm, a roller on said link, and yieldable means connected between said arm and link for positively engaging said roller with said V-shaped engaging surface and causing said roller to instantaneously move said lever arm in one direction as it passes by the apex of said V-shaped engaging surface in one direction and to instantaneously move said lever arm in an opposite direction as it moves past the apex of said lever arm when traveling in an opposite direction, to quickly move said valve piston to a full open or closed position of said passageway leading from said valve chamber.

3. In a pressure regulating valve, a valve block, a valve chamber within said block, an inlet passageway leading into said valve block to said valve chamber, a bypass passageway leading from said chamber out of said block, a valve piston movable within said chamber to and from a blocking position to block the passage of fluid from said valve chamber to said bypass passageway, a pressure passageway leading from said chamber out of said block, a check valve in said pressure passageway effective to prevent the back flow of fluid into said valve chamber, a surge chamber connected with said pressure passageway on the side of said check valve opposite said valve chamber, a piston movable within said surge chamber by pressure changes in said pressure passageway, and operative connecting means between the surge piston and said valve piston to move the latter away from its blocking position to release fluid through said bypass passageway responsive to a predetermined pressure in said pressure passageway, said operative connecting means including a rocking member associated with said surge piston and rockable thereby upon movement of said surge piston, an arm extending from said rocking member, a link pivoted to said arm, a lever arm having an operative connection with said valve piston for moving the latter within said valve chamber, a roller on said link, a cam surface on the end of said arm adapted to be engaged by said roller, and yieldable means connected with said link for operatively engaging said roller with said cam surface to cause said roller to instantaneously pivot said lever arm and move said valve piston along said valve chamber upon rocking movement of said lever arm.

4. In a pressure regulating valve, a valve block, a valve chamber within said block, an inlet passageway leading into said valve block to said valve chamber, a bypass passageway leading from said chamber out of said block, a valve piston movable within said chamber to and from a blocking position to block the passage of fluid from said valve chamber to said bypass passageway, an outlet pressure passageway leading from said chamber out of said block, check valve means associated with said valve effective to prevent backflow of fluid from said pressure passageway into said valve chamber, a surge chamber connected with said pressure passageway on the side of said check valve means opposite said valve chamber, a piston movable within said surge chamber responsive to pressure change in said pressure passageway, and operative connecting means between the surge piston and said valve piston for moving the latter away from its blocking position to release fluid through said bypass passageway responsive to a predetermined pressure in said pressure passageway, said operative connecting means including a roller associated and movable with one of said pistons and a pair of opposed cam surfaces associated and movable with the other piston and means for urging said roller against one or the other of said cam surfaces, said surfaces being oriented to move a link pivoted to said arm, a lever arm having said valve member between blocking and non-blocking positions responsive to relative movement between the cam surfaces, whereby said valve member is movable away from its said blocking position responsive to a predetermined rise of pressure in said pressure passageway and, whereby further, said valve member is movable to its said blocking position responsive to a predetermined fall of pressure in said pressure passageway.

5. In a pressure regulating valve, a valve block, a valve chamber within said block, an inlet passageway leading into said valve block to said valve chamber, a bypass passageway leading from said chamber out of said block, a valve piston movable within said chamber to and from a position to block the passage of fluid from said valve chamber to said bypass passageway, an outlet pressure passageway leading from said inlet passageway out of said block, check valve means associated with said pressure passageway effective to prevent the backflow of fluid toward said inlet passageway, a surge chamber connected with said pressure passageway on the side of said check valve opposite said valve chamber, a piston movable within said surge chamber, and operative connecting means between the surge piston and said valve piston to move the latter away from its said position to release fluid through said bypass passageway responsive to a predetermined pressure in said pressure passageway, said operative connecting means including a rocking member associated with said surge piston and rockable thereby upon movement of said surge piston, an arm extending from said rocking member, a link pivoted to said arm, a lever arm having an operative connection with said valve piston for moving the latter within said valve chamber, a roller on said link, a cam surface on the end of said lever arm adapted to be engaged by said roller, and yieldable means connected with said link for operatively engaging said roller with said cam surface to cause said release to instantaneously pivot said lever arm and move said valve piston along said valve chamber upon rocking movement of said lever arm.

6. In a pressure regulating valve, a valve body having a valve chamber therein, a pressure port connected to said valve chamber, a bypass port connected to said valve chamber, a valve member movable in said valve chamber to and from position blocking passage of fluid from said pressure port to said bypass port, a piston movable in response to pressure in excess of a predetermined amount at said pressure port, a spring opposing the movement of said piston, an arm having a pivot intermediate the ends thereof and arranged to rock in response to the pressure against said piston and the load in said spring, a rock arm pivotally connected at one end to said valve member, a V-cam surface at the other end of said rock arm, a toggle pivotally connected to said first named arm and resiliently urged into contact with one of said V-cam surfaces, said first named arm rocking in one direction when the pressure against said piston is below a predetermined amount to cause said toggle to engage one of said cam surfaces and rock said rock arm in a direction to move said valve member to position blocking said bypass port, and said first named arm rocking in another direction when the pressure against said piston is in excess of a predetermined amount to cause said toggle to engage the other of said cam surfaces and rock said rock arm in the other direction to move said valve member to position unblocking said bypass port.

7. In a pressure regulating valve, a valve body having a valve chamber therein, a pressure port connected to said valve chamber, a bypass port connected to said valve chamber, a valve member movable in said valve chamber to and from position blocking passage of fluid from said pressure port to said bypass port, a piston movable in response to pressure in excess of a predetermined amount at said pressure port, an arm having a pivot intermediate the ends thereof and arranged to rock in response to the pressure against said piston, a rock arm pivotally connected at one end to said valve member, a V-cam surface at the other end of said rock arm, a toggle pivotally connected to said first named arm and contacting said V-cam surface, said first named arm rocking in one direction when the pressure against said piston is below a predetermined amount to cause said toggle to engage one of said cam surfaces and rock said rock arm in a direction to move said valve member to position blocking said bypass port, and said first named arm rocking in another direction when the pressure against said piston is in excess of a predetermined amount to cause said toggle to engage the other of said cam surfaces and rock said rock arm in the other direction to move said valve member to position unblocking said bypass port.

8. In a pressure regulating valve, a valve body having a valve chamber therein, a pressure port connected to said valve chamber, a bypass port connected to said valve chamber, a valve member movable in said valve chamber to and from position blocking passage of fluid from said pressure port to said bypass port, a piston movable in response to pressure in excess of a predetermined amount at said pressure port, an arm having a pivot intermediate the ends thereof and arranged to rock in response to the pressure against said piston, a rock arm pivotally connected at one end to said valve member, a pair of cam surfaces at the other end of said rock arm, a toggle pivotally connected to said first named arm and in contact with one of said surfaces, said first named arm rocking in one direction when the pressure against said piston is below a predetermined amount to cause said toggle to engage one of said cam surfaces and rock said rock arm in a direction to move said valve member to position blocking said bypass port, and said first named arm rocking in another direction when the pressure against said piston is in excess of a predetermined amount to cause said toggle to engage the other of said cam surfaces and rock said rock arm in the other direction to move said valve member to position unblocking said bypass port.

JOSEPH J. SLOMER.

References Cited in the file of this patent

UNITED STATES PATENTS

| Number | Name | Date |
|---|---|---|
| 2,015,801 | Johnson | Oct. 1, 1935 |
| 2,103,299 | Reinsbeck | Dec. 28, 1937 |
| 2,310,677 | Campbell | Feb. 9, 1943 |
| 2,312,877 | Campbell | Mar. 2, 1943 |
| 2,339,378 | Clench | Jan. 18, 1944 |